(12) United States Patent
Yang et al.

(10) Patent No.: US 8,856,648 B2
(45) Date of Patent: Oct. 7, 2014

(54) APPARATUSES AND METHODS FOR REARRANGING MENU ITEMS

(75) Inventors: Kuo-Hsin Yang, Taipei (TW);
Xiaomeng Yan, Tianjin (CN)

(73) Assignee: Mediatek Inc., Hsin-Chu (TW)

( * ) Notice: Subject to any disclaimer, the term of this patent is extended or adjusted under 35 U.S.C. 154(b) by 380 days.

(21) Appl. No.: 13/031,725

(22) Filed: Feb. 22, 2011

(65) Prior Publication Data

US 2012/0036435 A1 Feb. 9, 2012

Related U.S. Application Data

(60) Provisional application No. 61/370,558, filed on Aug. 4, 2010.

(51) Int. Cl.
G06F 3/01 (2006.01)
G06F 3/0486 (2013.01)
G06F 3/0482 (2013.01)
G06F 3/0485 (2013.01)

(52) U.S. Cl.
CPC ............ *G06F 3/0482* (2013.01); *G06F 3/0486* (2013.01); *G06F 3/0485* (2013.01)
USPC ............ 715/702; 715/716; 715/760; 715/810

(58) Field of Classification Search
CPC .... G06F 3/0482; G06F 3/0486; G06F 3/0481
USPC ................................. 715/702, 810, 716, 760
See application file for complete search history.

(56) References Cited

U.S. PATENT DOCUMENTS

| 2008/0216005 | A1* | 9/2008 | Bamba et al. ................. 715/765 |
| 2009/0178008 | A1* | 7/2009 | Herz et al. ..................... 715/840 |
| 2009/0313567 | A1 | 12/2009 | Kwon et al. |
| 2011/0216095 | A1* | 9/2011 | Rydenhag ...................... 345/676 |
| 2011/0252375 | A1* | 10/2011 | Chaudhri ....................... 715/835 |
| 2011/0320976 | A1* | 12/2011 | Piersol et al. ................. 715/810 |
| 2012/0036552 | A1* | 2/2012 | Dare et al. ........................ 726/1 |
| 2012/0198330 | A1* | 8/2012 | Koppel et al. ................. 715/251 |

FOREIGN PATENT DOCUMENTS

| CN | 101561758 | | 10/2009 | |
| KR | 2007064869 | A * | 6/2007 | .............. G06F 3/041 |

OTHER PUBLICATIONS

Moscovich et al.; Contact Area Interaction with Sliding Widgets; © 2009; ACM; 10 pages.*
Roth et al.; Bezel Swipe: Conflict-Free Scrolling and Multiple Selection on Mobile Touch Screen Devices; © 2009; ACM; 4 pages.*
Zhang et al.; An Ergonomics Study of menu-Operation on Mobile Phone Interface; © 2007; IEEE; 5 pages.*
English language translation of abstract of CN 101561758 (published Oct. 21, 2009).

* cited by examiner

*Primary Examiner* — Linh K Pham
(74) *Attorney, Agent, or Firm* — McClure, Qualey & Rodack, LLP

(57) ABSTRACT

An electronic interaction apparatus is provided with a processing unit. The processing unit detects a drag event on a touch screen to indicate a first position to which a menu item is moved, and determines whether the first position corresponds to a page indicator other than a currently highlighted page indicator. If so, the processing unit further configures the touch screen to display a plurality of first menu items corresponding to the page indicator.

12 Claims, 12 Drawing Sheets

APPARATUSES AND METHODS FOR REARRANGING MENU ITEMS

CROSS REFERENCE TO RELATED APPLICATIONS

This Application claims priority of U.S. Provisional Application No. 61/370,558, filed on Aug. 4, 2010, and the entirety of which is incorporated by reference herein.

BACKGROUND OF THE INVENTION

1. Field of the Invention

The invention generally relates to management of menu items, and more particularly, to apparatuses and methods for arranging menu items in a paging manner and rearranging the paged menu items for crossing page(s).

2. Description of the Related Art

To an increasing extent, display panels are being used for electronic devices, such as computers, mobile phones, media player devices, and gaming devices, etc., as human-machine interfaces. The display panel may be a touch panel which is capable of detecting the contact of objects thereon, wherein users may interact with the touch panel by using pointers, styluses, or their fingers, etc. Also, the display panel may be provided with a graphical user interface (GUI) for users to view the menu items representing installed or built-in applications or widgets. Generally, the size of a display panel of an electronic device is designed to be small, and the number of menu items may be more than what the display panel may be capable of displaying. To solve this problem, the menu items may be divided into groups, so that the display panel may display one specific group of menu items at a time. As shown in FIGS. 1a-1d, a total number of 52 menu items are divided into 4 groups, wherein each is displayed in a respective page. The 4 pages may be configured in a horizontal manner, in which the user would drag an object on the display panel from the right to the left to turn to a next page. Alternatively, the 4 pages may be configured in a vertical manner, in which the user would drag an object on the display panel from the top to the bottom to turn to a next page.

Conventionally, if a user wishes to rearrange the groups of menu items, e.g. relocate a specific menu item of group 1 to group 4, the user would need to move the specific menu item from Page 1, across Page 2 and Page 3, to Page 4, as shown in FIG. 2. Specifically, during the first time interval t1, the user drags the specific menu item to the right edge of Page 1 until Page 2 is displayed with the second group of menu items. During the second time interval t2, the dragging of the specific menu item continues to the right edge of Page 2 until Page 3 is displayed with the third group of menu items. During the third time interval t3, the dragging of the specific menu item continues further to the right edge of Page 3 until Page 4 is displayed with the fourth group of menu items. Lastly, during the fourth time interval t4, the user may drag the specific menu item away from the right edge of Page 4 and then to a desired position in Page 4. Accordingly, the conventional way of rearranging menu items is time consuming and complex, especially when the number of pages to cross increases. Thus, it is desirable to have an efficient and intuitive way of rearranging menu items.

BRIEF SUMMARY OF THE INVENTION

Accordingly, embodiments of the invention provide apparatuses and methods for rearranging menu items. In one aspect of the invention, an electronic interaction apparatus is provided. The electronic interaction apparatus comprises a processing unit. The processing unit detects a drag event on a touch screen to indicate a first position to which a menu item is moved, and determines whether the first position corresponds to a page indicator other than a currently highlighted page indicator. If so, the processing unit further displays a plurality of first menu items corresponding to the page indicator.

In another aspect of the invention, a method for rearranging menu items in an electronic apparatus with a touch screen is provided. The method comprises the steps of detecting, on the touch screen, a drag event indicating a first position to which a menu item is moved, determining whether the first position corresponds to a page indicator other than a currently highlighted page indicator, and if so, displaying a plurality of first menu items corresponding to the page indicator.

Other aspects and features of the present invention will become apparent to those with ordinarily skill in the art upon review of the following descriptions of specific embodiments of the apparatus and methods for rearranging menu items.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 3:
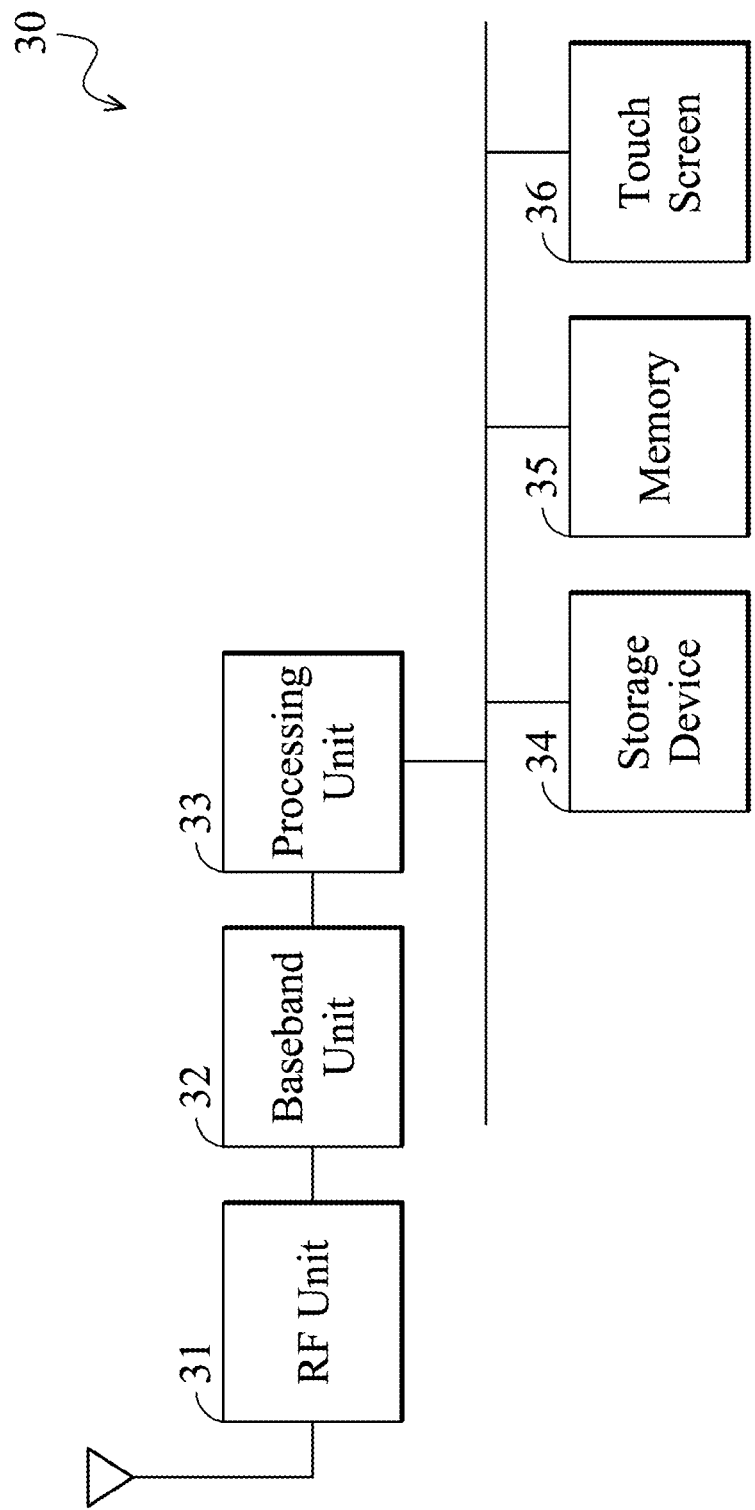
FIG. 3 shows a block diagram of a mobile phone according to an embodiment of the invention.

FIG. 3 shows a block diagram of a mobile phone according to an embodiment of the invention. The mobile phone 30 is equipped with a Radio Frequency (RF) unit 31 and a Baseband unit 32 to communicate with a corresponding node via a cellular network. The Baseband unit 32 may contain multiple hardware devices to perform baseband signal processing, including analog to digital conversion (ADC)/digital to analog conversion (DAC), gain adjusting, modulation/demodulation, encoding/decoding, and so on. The RF unit 31 may receive RF wireless signals, convert the received RF wireless signals to baseband signals, which are processed by the Baseband unit 32, or receive baseband signals from the Baseband unit 32 and convert the received baseband signals to RF wireless signals, which are later transmitted. The RF unit 31 may also contain multiple hardware devices to perform radio frequency conversion. For example, the RF unit 31 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in WCDMA systems, or others depending on the radio access technology (RAT) in use. The mobile phone 30 is further equipped with a touch screen 36 as part of a man-machine interface (MMI). The MMI is the means by which people interact with the mobile phone 30. The MMI may contain displayed screen menus, icons, text messages, and so on, as well as physical buttons, keypad and the touch screen 36, and so on. The touch screen 36 is a display screen that is sensitive to the touch or approximation of a finger or stylus. The touch screen 36 may be a resistive or capacitive type, or others. Users may manually touch, press, or click the touch screen to operate the mobile phone 30 with the indication of the displayed menus, icons or messages. A processing unit 33 of the mobile phone 30, such as a general-purpose processor or a micro-control unit (MCU), or others, loads and executes a series of program codes from a memory 35 or a storage device 34 to provide MMI functions for users. It is to be understood that the introduced method for rearranging menu items may be applied to different electronic apparatuses, such as portable media players (PMP), global positioning system (GPS) navigation devices, portable gaming consoles, and so on, without departing from the spirit of the invention.

Figure 1A:
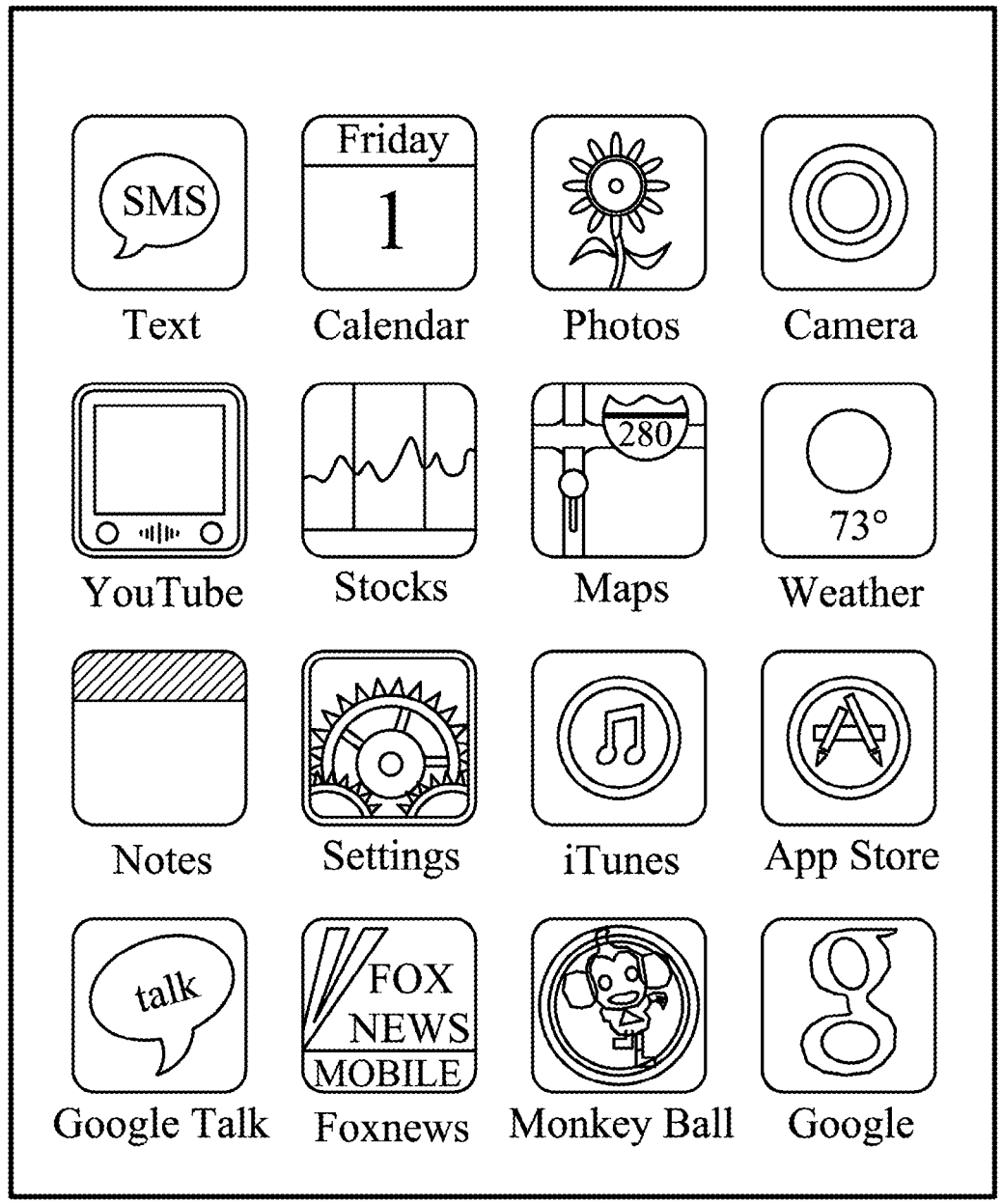
FIGS. 1a to 1d show schematic diagrams of an arrangement of menu items.
Figure 1B:
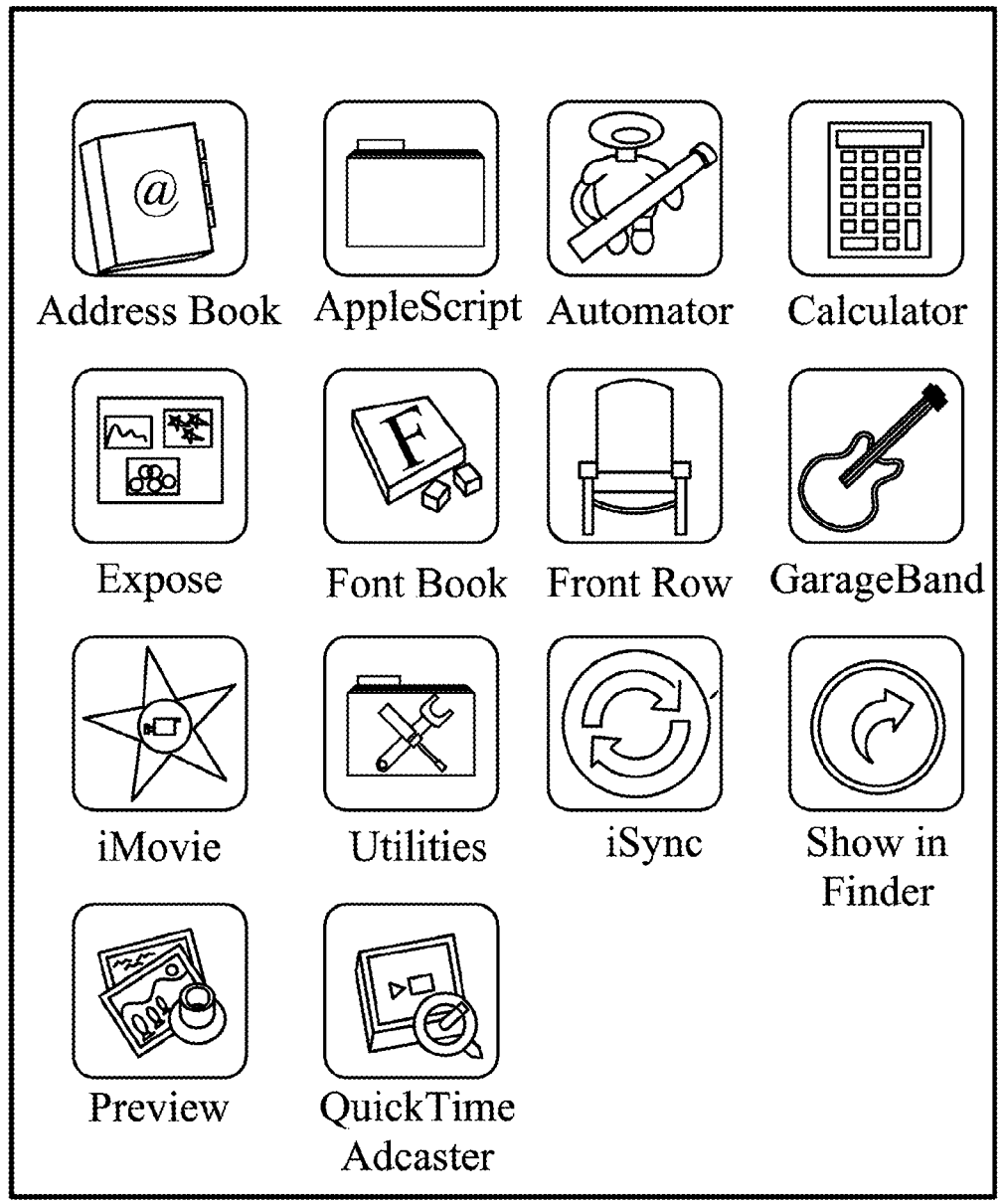
Figure 1C:
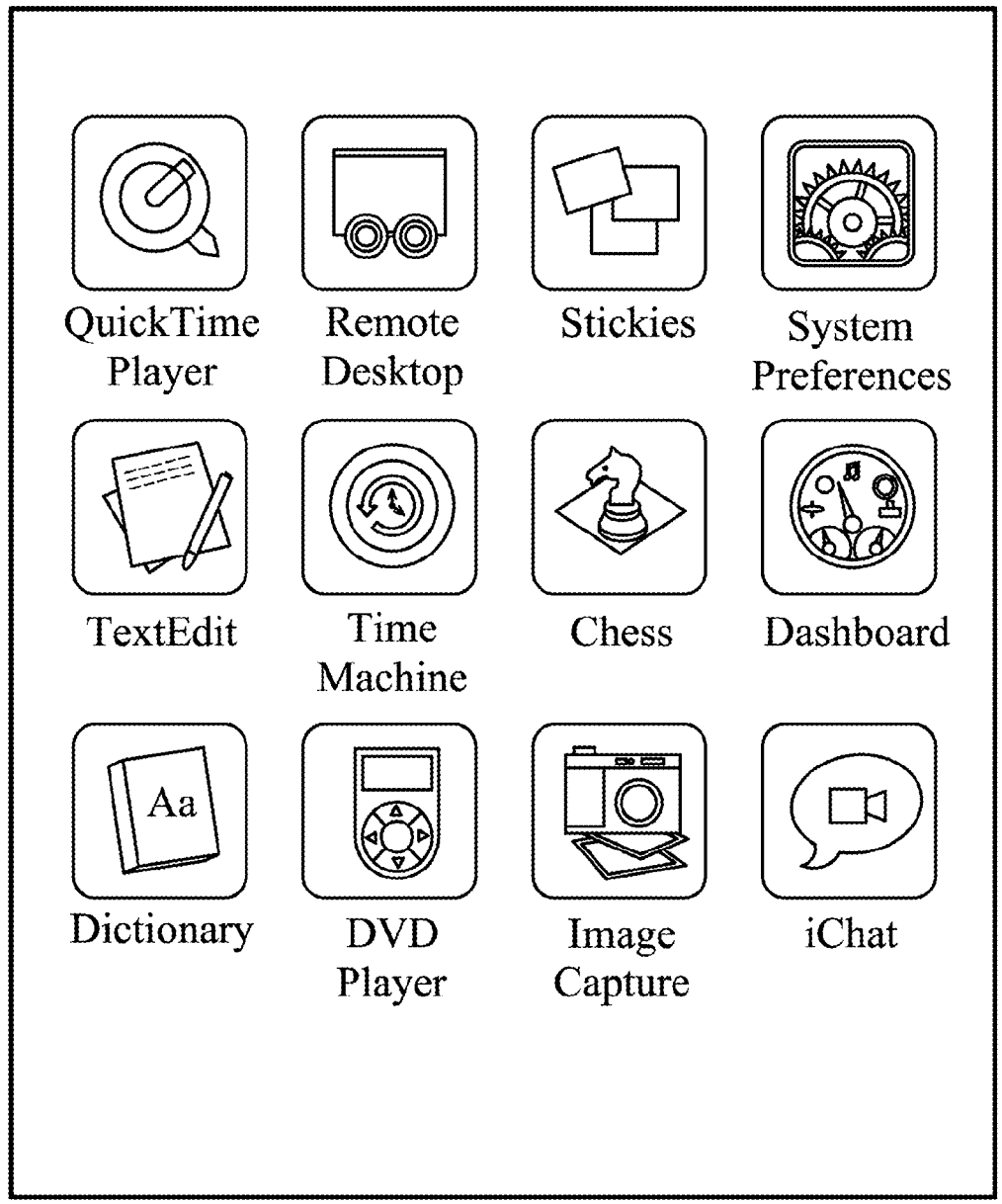
Figure 1D:
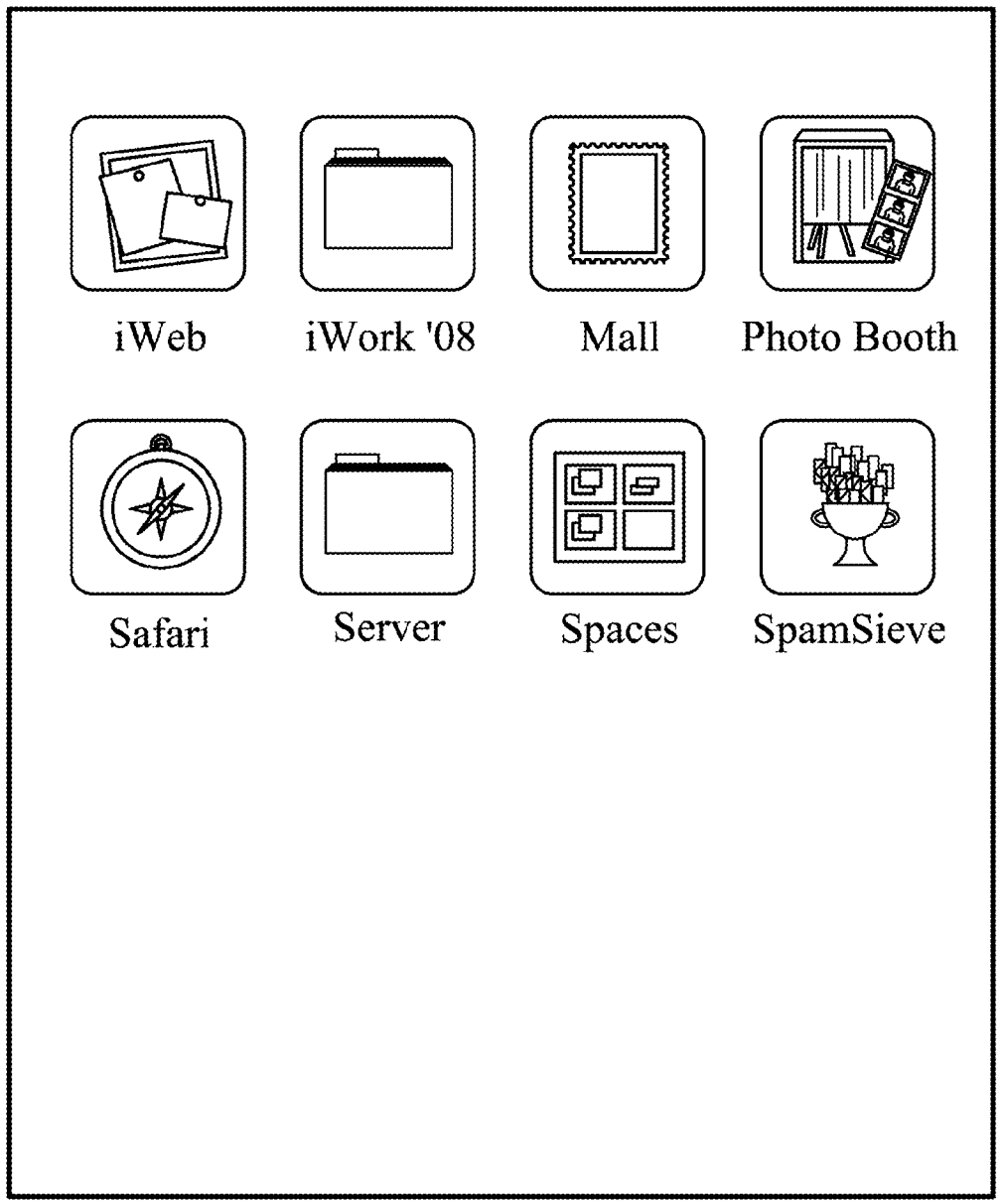
Figure 2:
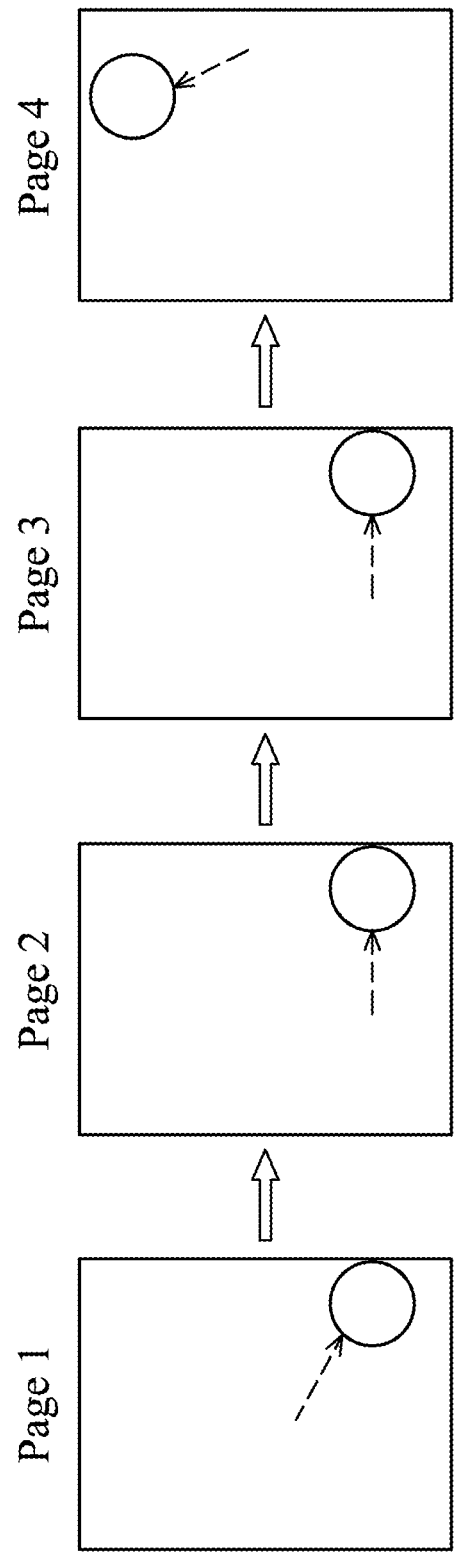
FIG. 2 shows schematic diagrams of a conventional rearrangement of menu items.
Figure 4B:
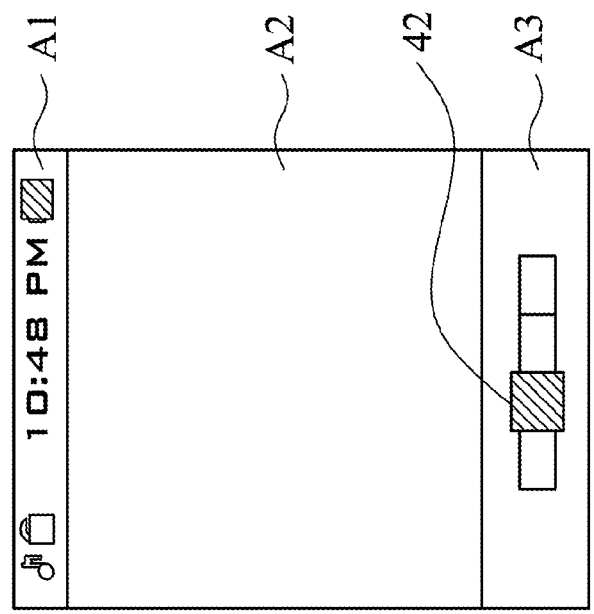
FIGS. 4a to 4d show schematic diagrams of an arrangement of menu items according to an embodiment of the invention.
Figure 4A:
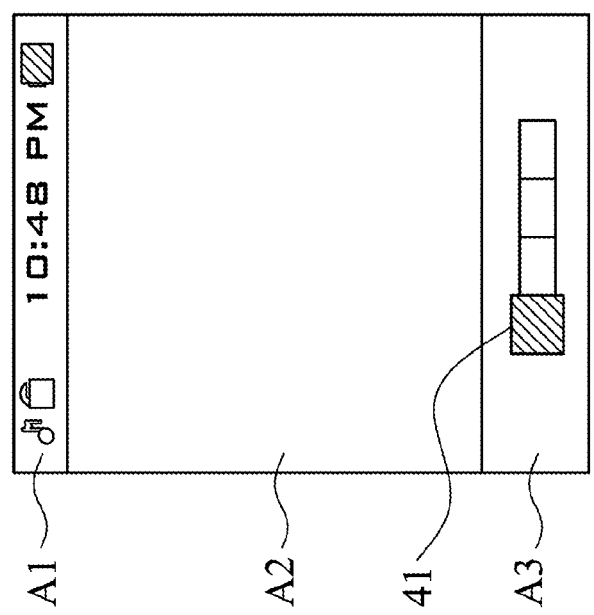
Figure 4D:
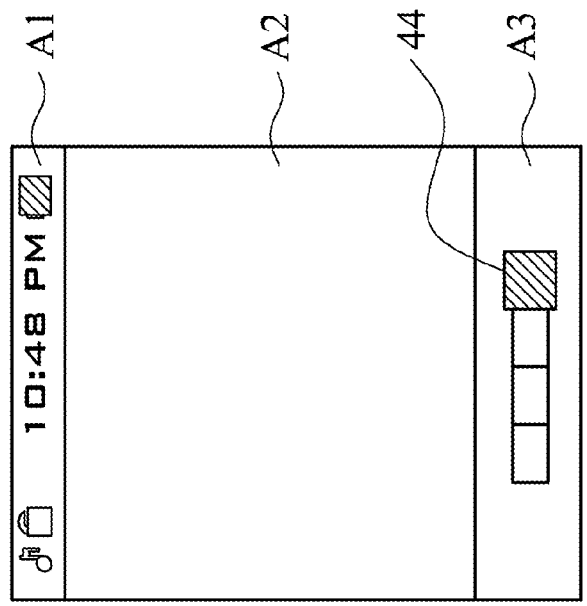
Figure 4C:
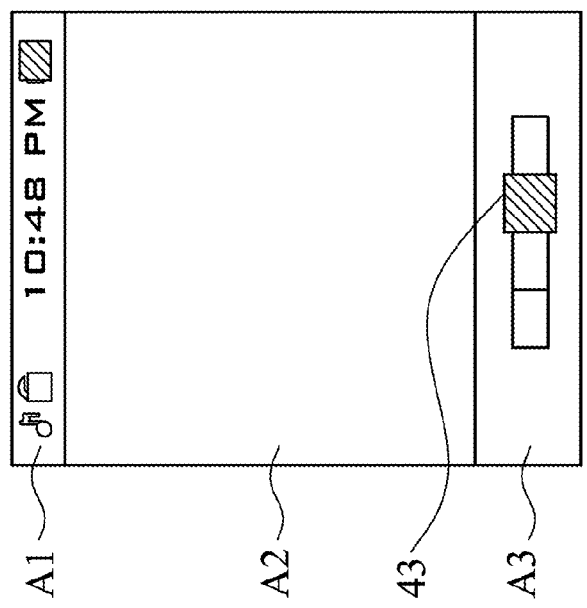

To further clarify, the processing unit 33 configures the touch screen 36 to provide visual presentations of menu items for installed or built-in applications or widgets of the mobile phone 30. The menu items may be divided into a plurality of sets, and each set of menu items is displayed in a respective page on the touch screen 36. Also, the touch screen 36 is configured by the processing unit 33 to provide visual presentations of a plurality of page indicators, each associated with a page corresponding to a set of menu items. FIGS. 4a to 4d show an exemplary arrangement of menu items displayed on the touch screen 36 according to an embodiment of the invention. As shown in FIGS. 4a to 4d, the entire screen is partitioned into 3 areas. The area A1 displays the system status, such as currently enabled functions, phone lock status, current time, remaining battery power, and so on. The area A2 displays the set of menu items for the currently selected page. The area A3 displays a row of page indicators, in which one page indicator associated with the currently selected page is highlighted as a prompt to users. In this embodiment, there are 53 menu items representing 53 installed or built-in applications or widgets of the mobile phone 30. The menu items are divided into 4 sets, and each set of the menu items is displayed in a respective page. If the currently selected page is Page 1, the first page indicator 41 is highlighted and the first set of menu items comprising 16 menu items is displayed, as shown in FIG. 1a as an example. Next, if the currently selected page is Page 2, the second page indicator 42 is highlighted and the second set of menu items comprising 14 menu items is displayed, as shown in FIG. 1b as an example. Following, if the currently selected page is Page 3, the third page indicator 43 is highlighted and the third set of menu items comprising 12 menu items is displayed, as shown in FIG. 1c as an example. Lastly, if the currently selected page is Page 4, the fourth page indicator 44 is highlighted and the fourth set of menu items comprising 9 menu items is displayed, as shown in FIG. 1d as an example. Note that the menu items arranged in a page may be in any number from 1 to the maximum number of menu items that can be displayed in one page, e.g. 16 as shown in FIG. 4a.

Figure 5:
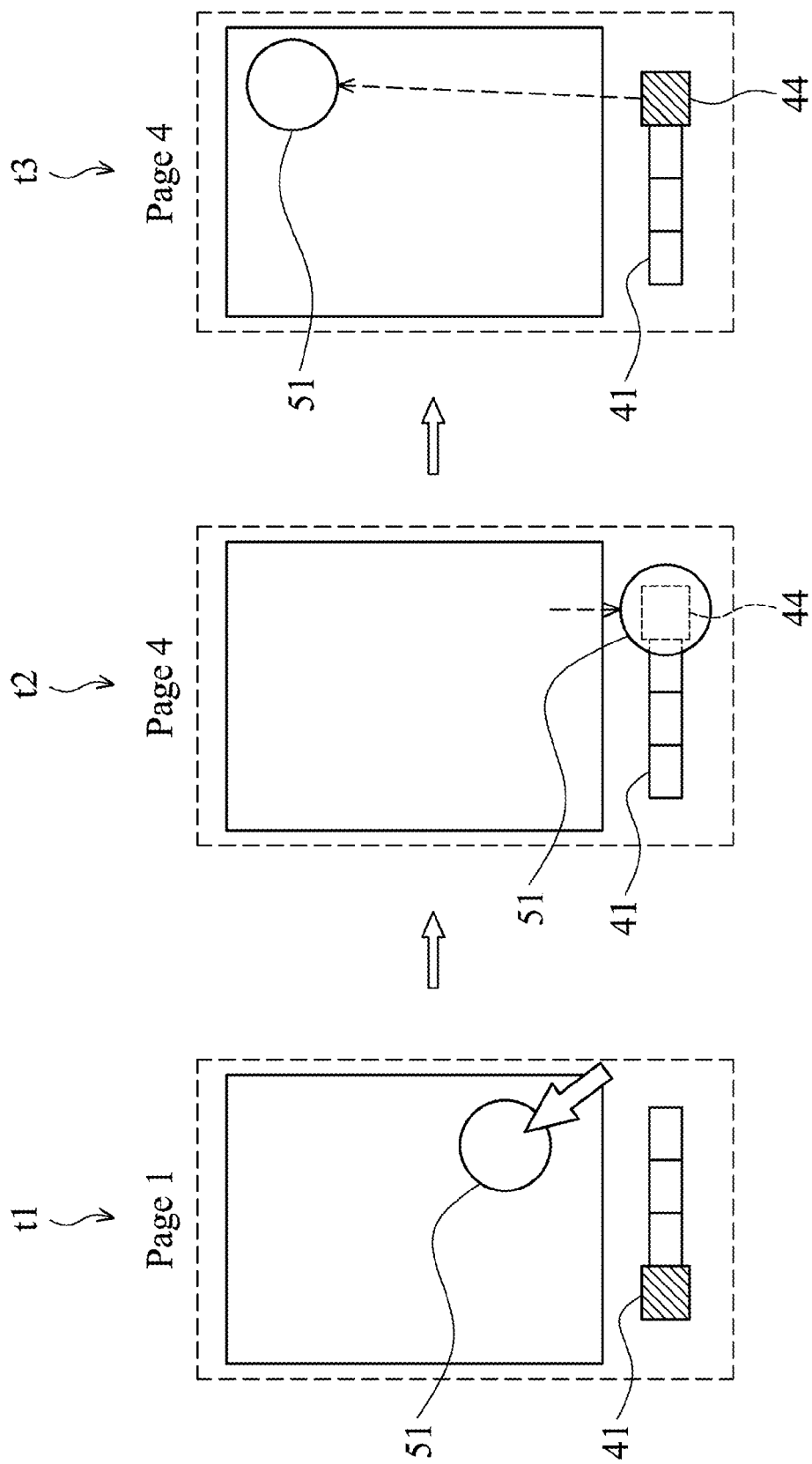
FIG. 5 shows schematic diagrams of a rearrangement of menu items according to an embodiment of the invention.
Figure 6:
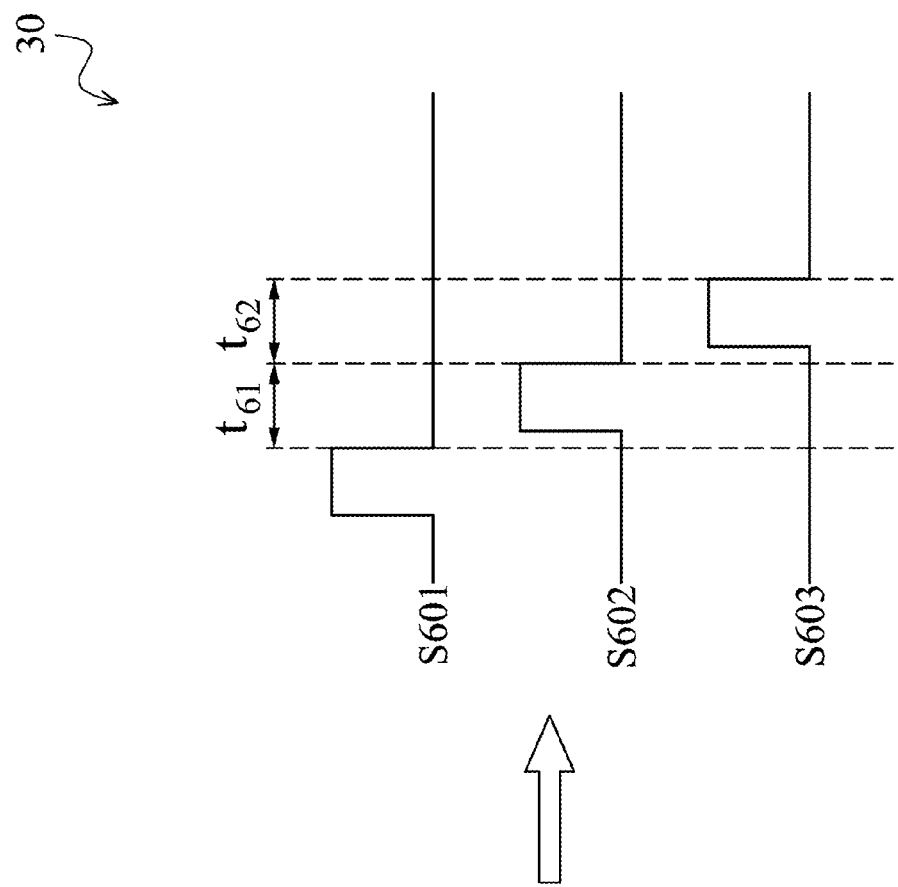
FIG. 6 shows a schematic diagram of a downward drag event with signals S601 to S603 corresponding to locations 6001 to 6003 respectively according to an embodiment of the invention.
Figure 6:
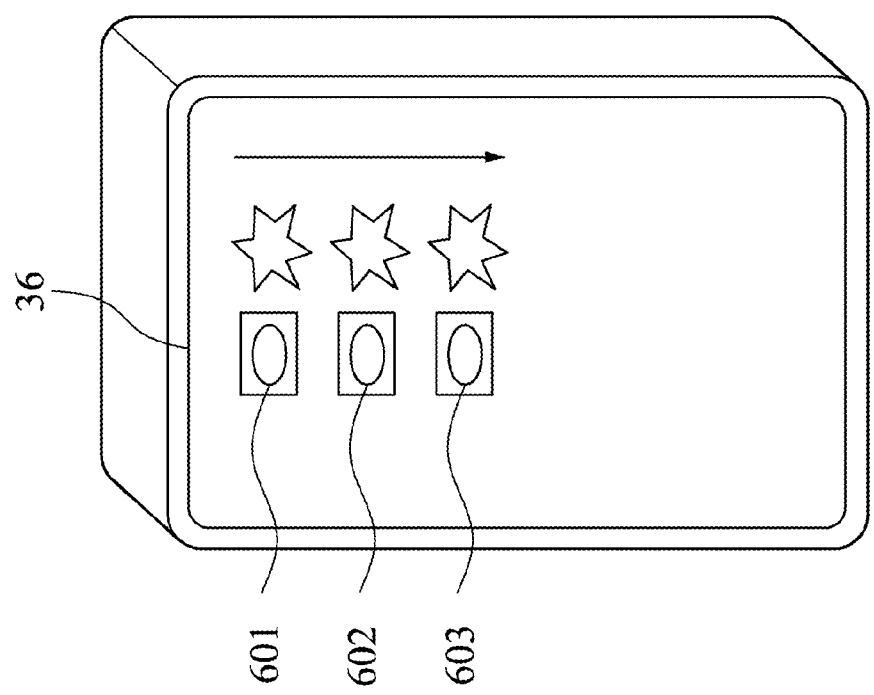

In addition to the arrangement of the menu items as described with respect to FIGS. 4a to 4d, the processing unit 33 provides ways of rearranging the menu items with the touch screen 36. If a user wishes to rearrange a menu item, e.g. relocate a specific menu item from one page to another, he/she simply moves the specific menu item to a position corresponding to the page indicator associated with the target page. When it is determined that the position of the menu item corresponds to a page indicator other than the currently highlighted page indicator, the processing unit 33 configures the touch screen 36 to display the target page to replace the previously displayed page. After the target page is displayed, the user continues to move the specific menu item to the desired position in the target page. FIG. 5 shows schematic diagrams of a rearrangement of menu items according to an embodiment of the invention. In this embodiment, the first page indicator 41 is highlighted and the user wishes to move a menu item from Page 1 to Page 4. During the first time interval t1, the user uses an object to touch or approximate a specific menu item 51 displayed on the touch screen 36. During the second time interval t2, the touch or approximation of the object continues to move the menu item 51 to the position of the fourth page indicator, and the fourth page indicator 44 is highlighted while the first page indicator 41 is un-highlighted. Meanwhile, the specific menu item 51 is removed from the Page 1. As soon as the fourth page indicator 44 is highlighted, menu items on Page 4 are displayed to replace that on Page 1. During the third time interval t3, the user further continues the touch or approximation of the object to move the menu item 51 to a desired position in Page 4 and then leaves the object from the touch screen 36. In response to the object leaving the touch screen 36, the specific menu item 51 is added to Page 4. The continuous touch or approximation of the object may be identified as a drag event, a pen-move event, or slide event on the touch screen 36. FIG. 6 shows a schematic diagram of a downward drag event with signals S1 to S3 corresponding to locations 601 to 603 respectively according to an embodiment of the invention. The continuous touch is detected by the processing unit 33 via the sensors placed on or under the locations 601 to 603 of the touch screen 36. The time interval $t_{61}$ between the terminations of the first and second touch detections, and the time interval $t_{62}$ between the terminations of the second and third touch detections are obtained by the processing unit 33. Particularly, the drag event is determined by the processing unit 33 when detecting each of time intervals $t_{61}$ and $t_{62}$ is limited within a predetermined time interval. The drag events in other directions, such as upward, leftward, and rightward drag events can be determined in a similar way, and are omitted herein for brevity. It is noted that, with the introduced method for rearranging menu items, the switching from the current page to the target page is done efficiently without having to wait for crossing the pages therebetween.

The processing unit 33 may further determine whether the dropped position in Page 4 falls between two of or among three or more of the displayed menu items in Page 4. If so, the processing unit 33 rearranges the menu items in Page 4 to insert the moved menu item 51. That is, the moved menu item 51 is inserted at the dropped position among the menu items in Page 4. Otherwise, the processing unit 33 appends the moved menu item 51 to the end in Page 4. In addition, a gliding animation effect may be provided to show that the moved menu item has shifted gradually from the dropped position straight to a designated position to line up all displayed menu items. The moving speed of the animation may be at a constant rate or variable rates, such as decreased rates, as the menu item moves toward the designated position. Alternatively, the gliding animation effect may show that the moved menu item has shifted at rates compliant with the Bézier curve. An exemplary pseudo code for the gliding animation effect contains three exemplary functions for computing the next position in which the moved menu item is to be displayed. Those skilled in the art may select one to play the gliding animation effect. When executing the function "constant_speed_gliding", the menu item is moved at a constant rate. When executing the function "approximate_ease_out_gliding", the menu item is moved based on the ease out formula. When executing the function "approximate_bezier_ease_outgliding", the menu item is moved using the Bézier curve.

```
GlidingAnimationEffect Algorithm
{
    time = 0 ~ 1;
    (x0, y0) = current position in which the menu item being currently
displayed (i.e. to which it is dropped);
    (x1, y1) = desired position;
    function constant_speed_gliding (time)
    {
        x = x0 + (x1 − x0) * time;
        y = y0 + (y1 − y0) * time;
    }
    function approximate_ease_out_gliding (time)
    {
        s = 1 − (1 − time) * (1 − time) * (1 − time);
        x = x0 + (x1 − x0) * s;
        y = y0 + (y1 − y0) * s;
    }
    function approximate_bezier_ease_out_gliding (time)
    {
        p0 = 0;
        p1 = 0.9;
        p2 = 1;
        s = p0 + 2 * (p1 − p0) * time + (p0 − 2 * p1 + p2) * time * time;
        x = x0 + (x1 − x0) * s;
        y = y0 + (y1 − y0) * s;
    }
}
```

The information regarding the arrangement of the menu items may be maintained using data structures to indicate the relationships between the menu items and the pages. In an embodiment, a first table may be used to store the profile data of the menu items, such as the icon images, the displayed texts, and others, as shown below in Table 1.

TABLE 1

| Index | Image | Text | Others |
|---|---|---|---|
| MenuItem1 | Image1 | Text | ... |
| MenuItem2 | Image2 | Calendar | ... |
| MenuItem3 | Image3 | Photos | ... |
| MenuItem4 | Image4 | Camera | ... |
| MenuItem5 | Image5 | YouTube | ... |
| . | . | . | . |
| . | . | . | . |
| . | . | . | . |
| MenuItem53 | Image53 | SpamSieve | ... |

The "Index" field indicates the index of a menu item, the "Image" field may store bitmap data of an icon image or a file directory pointing to where actual bitmap data of an icon image is stored, and the "Text" field indicates the text to be displayed with the corresponding icon image. The "Others" field indicates supplementary information concerning the menu item, such as the type of the installed or built-in application or widget, the address of the installed or built-in application or widget in the storage medium, the execution parameters, and so on. Additionally, a second table may be used to store the information of the relationships between the pages and the menu items, as shown below in Table 2.

TABLE 2

| Page index | Serial number | MenuItem index |
|---|---|---|
| 1 | 1 | MenuItem1 |
| 1 | 2 | MenuItem2 |
| . | . | . |
| . | . | . |
| . | . | . |
| 2 | 1 | MenuItem17 |
| 2 | 2 | MenuItem18 |
| . | . | . |
| . | . | . |
| . | . | . |
| 4 | 1 | MenuItem43 |
| 4 | 2 | MenuItem44 |
| . | . | . |
| . | . | . |
| . | . | . |

The "Page index" field indicates the index of a page, the "Serial number" field indicates the order of a menu item among all of the menu items in the same page, and the "MenuItem Index" field indicates the index of a menu item in Table 1. By referring to the value of the page indicator to the "Page index" field in Table 2, the information of the corresponding menu items may be obtained and accordingly, the corresponding menu items are displayed. For software implementation, Table 1 and Table 2 may be established using multi-dimensional arrays, linked lists, or others. Note that, Table 1 and Table 2 may alternatively be integrated into a single table, and the invention should not be limited thereto.

Figure 7A:
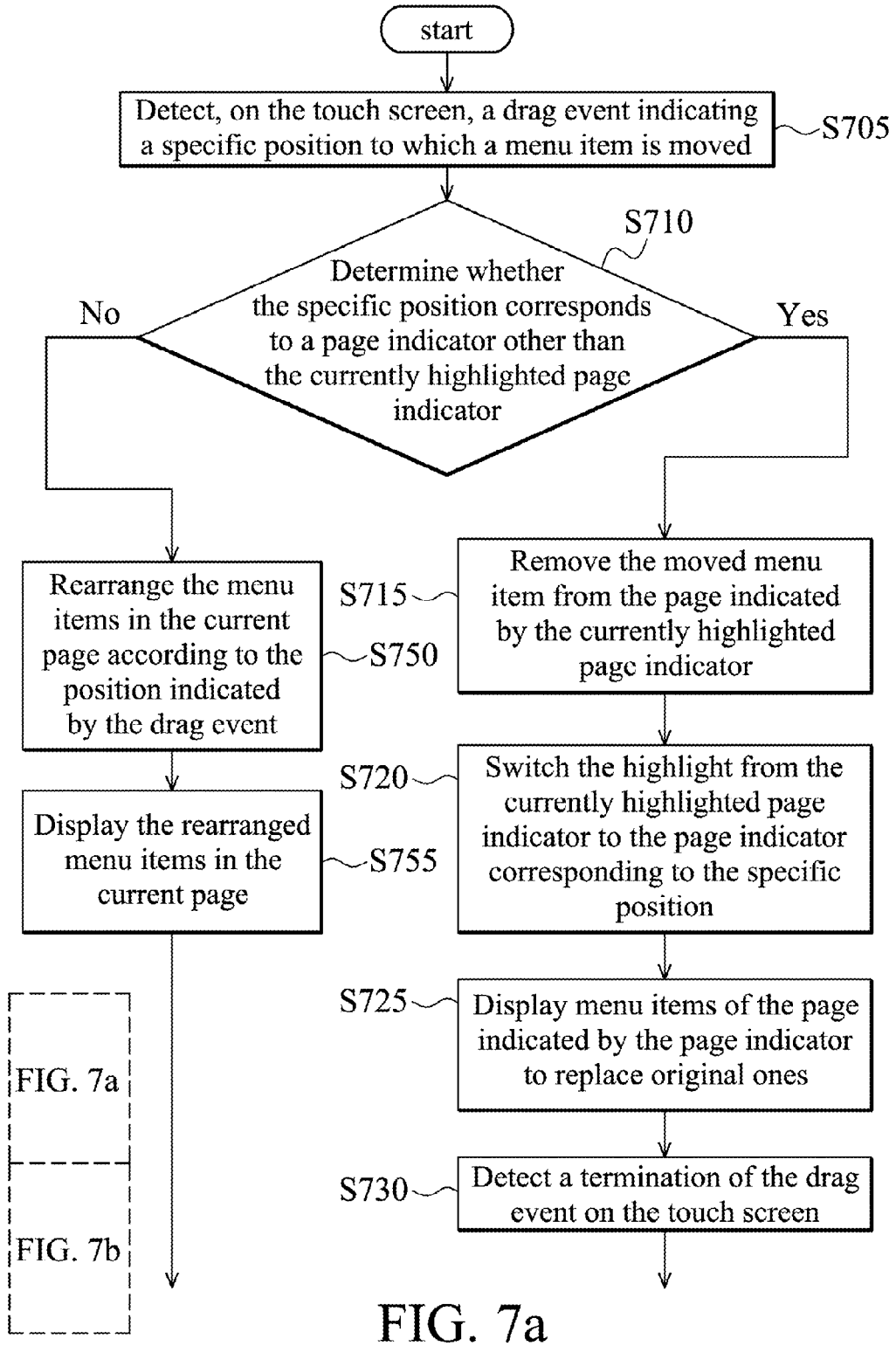
FIGS. 7a and 7b show a flow chart illustrating the method for rearranging menu items according to an embodiment of the invention.
Figure 7B:
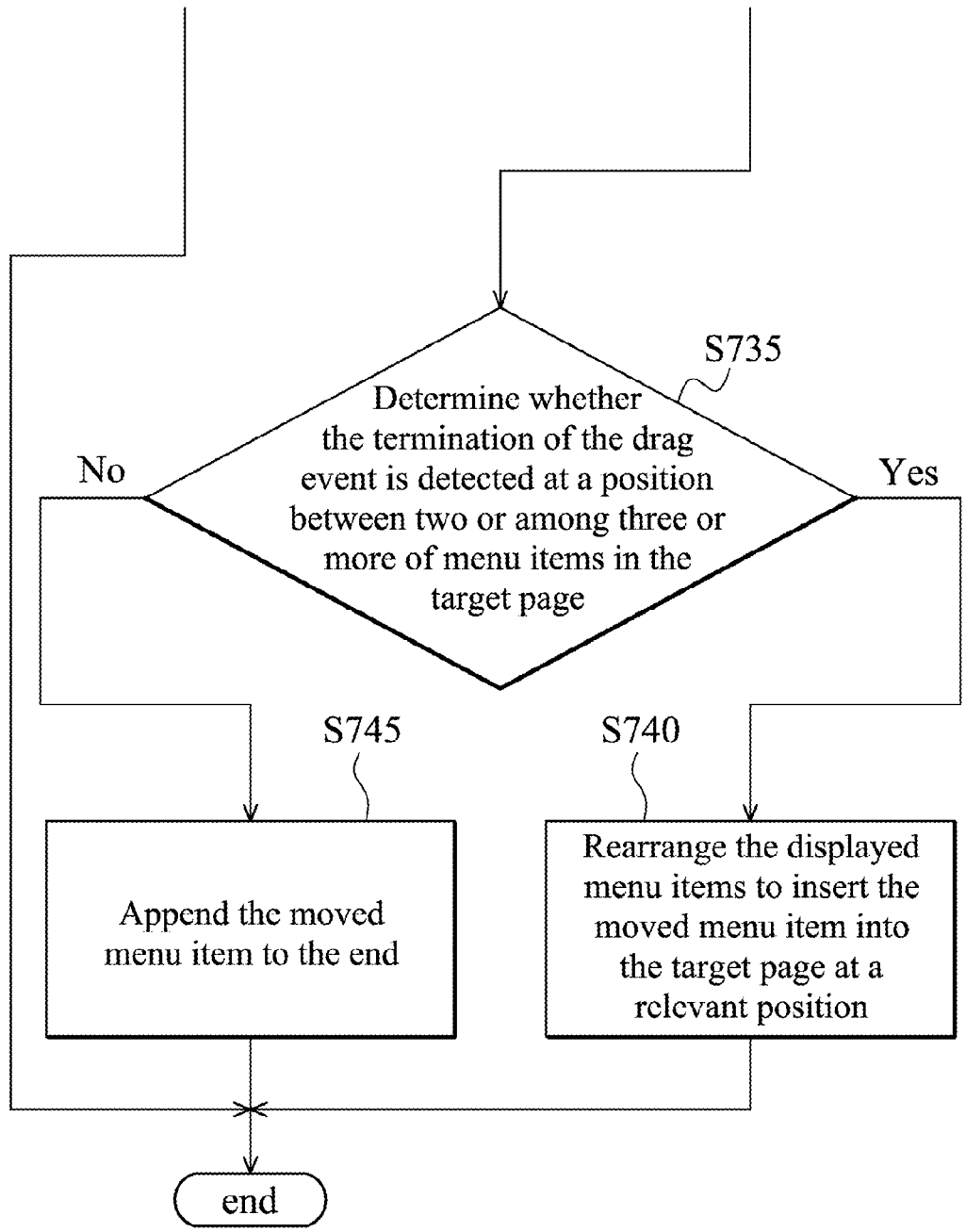

FIGS. 7a and 7b show a flow chart illustrating the method for rearranging menu items according to an embodiment of the invention. The method may be applied in an electronic apparatus equipped with a touch screen, such as the mobile phone 30, a PMP, a GPS navigation device, portable gaming console, and so on. Take the mobile phone 30 for example. When the mobile phone 30 is started up, a series of initialization processes, including booting up of the operating system, initializing of the MMI, and activating of the embedded or coupled functional modules (such as the touch screen 36), etc., are performed. After the initialization processes are finished, the MMI is provided via the touch screen 36 for a user to interact with. When the user selects to view the arrangement of the menu items representing the installed or built-in applications or widgets of the mobile phone 30, the menu items are displayed in a paged manner, wherein the menu items are divided into a plurality of sets and each page comprises one set of menu items. In this embodiment, additionally, the mobile phone 30 also displays a plurality of page indicators which each indicates a respective page among the pages and the page indicator of the currently displayed page is highlighted as a prompt to the user. To begin with the method for rearranging menu items, the mobile phone 30 detects, on the touch screen 36, a drag event indicating a specific position to which a menu item is moved (step S705). In response to the detection, the mobile phone 30 determines whether the specific position corresponds to a page indicator other than the currently highlighted page indicator (step S710). If so, the mobile phone 30 removes the moved menu item from the page indicated by the currently highlighted page indicator (referred to herein as the source page) (step S715), and switches the highlight from the currently highlighted one to the page indicator corresponding to the specific position (step S720). The mobile phone 30 may remove the entry of the moved menu item from Table 2 which is temporally stored in a memory. Upon switching the highlight between the page indicators, the mobile phone 30 also displays menu items of the page indicated by the page indicator (referred to herein as the target page) to replace original ones (step S725).

Later, when a termination of the drag event is detected on the touch screen 36 (step S730), the mobile phone 30 further determines whether the termination of the drag event is detected at a position between two or among three or more of menu items in the target page (step S735). If so, the mobile phone 30 rearranges the displayed menu items to insert the moved menu item into the target page at a relevant position (step S740). That is, for example, the menu item is dragged to and dropped on a position originally occupied by one menu item, and the originally occupied menu item and the following ones are afterward shifted one position in sequence. Otherwise, if the termination of the drag event is detected on a position corresponding to none of (or outside of) the displayed menu items in the target page, the mobile phone 30 appends the moved menu item to the end (step S745). Appending the moved menu item to the end means arranging the moved menu item next to the last of originally displayed menu items. In one embodiment, the appending of the moved menu item may be displayed with a gliding animation effect. The gliding animation effect may show that the menu item is being shifted gradually from the drop position straight to a position subsequent to the last displayed menu item. The moving speed of the animation may be at a constant rate or variable rates, such as decreased rates, as the menu item moves toward the target position. Alternatively, the gliding animation effect may show that the moved menu item is shifted at rates compliant with the Bézier curve. Regarding the detailed descriptions of how the gliding animation effect is provided, reference may be made to the exemplary pseudo code described above with respect to the functions "constant_speed_gliding", "approximate_ease_out_gliding", and "approximate_bezier_ease_outgliding".

In steps S740 and S745, a new entry for the moved menu item is inserted into Table 2 to facilitate the MMI to refresh the order of the displayed menu items of the target page. For example, if the moved menu item "MenuItem1" is moved from the first position of Page 1 to the first position of Page 4, then Table 2 is modified as follows (the modified entries are marked in bold and italic).

| Page index | Serial number | MenuItem index |
|---|---|---|
| *1* | *1* | *MenuItem2* |
| *1* | *2* | *MenuItem3* |
| . | . | . |
| . | . | . |
| . | . | . |
| 2 | 1 | MenuItem17 |
| 2 | 2 | MenuItem18 |
| . | . | . |
| . | . | . |
| . | . | . |
| *4* | *1* | *MenuItem1* |
| *4* | *2* | *MenuItem43* |
| . | . | . |
| . | . | . |

Subsequent to step S710, if not, the mobile phone 30 rearranges the menu items in the current page according to the position indicated by the drag event (step S750). In an embodiment, the rearrangement of the menu items may be performed in response to detecting the termination of the drag event. During the rearrangement of the menu items, the mobile phone 30 relocates the entry of the moved menu item of the current page in Table 2, and modifies the serial numbers of affected entries. For example, if the menu item "MenuItem1" is moved from the first position in Page 1 to the second position, then Table 2 is modified as follows (the modified entries are marked in bold and italic).

| Page index | Serial number | MenuItem index |
|---|---|---|
| *1* | *1* | *MenuItem2* |
| *1* | *2* | *MenuItem1* |
| . | . | . |
| . | . | . |
| . | . | . |
| 2 | 1 | MenuItem17 |
| 2 | 2 | MenuItem18 |
| . | . | . |
| . | . | . |
| . | . | . |
| 4 | 1 | MenuItem43 |
| 4 | 2 | MenuItem44 |
| . | . | . |
| . | . | . |

After that, the mobile phone 30 accordingly displays the rearranged menu items in the current page (step S755).

Note that use of ordinal terms such as "first", "second", "third", etc., in the claims to modify a claim element does not by itself connote any priority, precedence, or order of one claim element over another or the temporal order in which acts of the method are performed, but are used merely as labels to distinguish one claim element, having a certain name, from another element, having a same name (except for use of ordinal terms), to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic interaction apparatus, comprising:
   a processing unit detecting a drag event on a touch screen to indicate moving a menu item from a first page to a first position of a page indicator,
   determining whether the page indicator corresponds to a second page other than the first page, and if so, configuring the touch screen to display the second page and moving the menu item to a desired position in the second page;
   wherein the second page is displayed to replace items the first page where the menu item is moving from; and
   wherein, if the page indicator corresponds to the second page other than the first page, the processing unit further configures the touch screen to un-highlight a currently highlighted page indicator corresponding to the first page and highlight the page indicator.

2. The electronic interaction apparatus of claim 1, wherein the moving of the menu item to the desired position in the second page is performed in response to a termination of the drag event.

3. The electronic interaction apparatus of claim 2, wherein the moving of the menu item to the desired position in the second page comprises inserting the moved menu item into a plurality of first menu items in the second page when the termination of the drag event is detected on a second position between two of the first menu items, or among three or more of the first menu items.

4. The electronic interaction apparatus of claim 3, wherein the processing unit further configures the touch screen to play a gliding animation to show the inserting of the moved menu item to the first menu items.

5. The electronic interaction apparatus of claim 2, wherein the moving of the menu item to the desired position in the second page comprises appending the moved menu item to the end of a plurality of first menu items in the second page when the termination of the drag event is detected on a second position corresponding to none of the first menu items.

6. The electronic interaction apparatus of claim 5, wherein the processing unit further configures the touch screen to play a gliding animation to show the appending of the moved menu item to the end.

7. A method for rearranging menu items in an electronic apparatus with a touch screen, comprising:
   detecting, on the touch screen, a drag event indicating moving a menu item from a first page to a first position of a page indicator;
   determining whether the page indicator corresponds to a second page other than the first page; and
   if so, displaying the second page and moving the menu item to a desired position in the second page;
   wherein the second page is displayed to replace the first page where the menu item is moving from and un-highlighting a currently highlighted page indicator corresponding to the first page and highlighting the page indicator, if the page indicator corresponds to the second page other than the first page.

8. The method of claim 7, wherein the moving of the menu item to the desired position in the second page is performed in response to a termination of the drag event.

9. The method of claim 8, wherein the moving of the menu item to the desired position in the second page comprises inserting the moved menu item into a plurality of first menu items in the second page when the termination of the drag event is detected on a second position between two of the first menu items, or among three or more of the first menu items.

10. The method of claim 9, wherein the moving of the menu item to the desired position in the second page further comprises playing a gliding animation to show the inserting of the moved menu item to the first menu items.

11. The method of claim 8, wherein the moving of the menu item to the desired position in the second page comprises appending the moved menu item to the end of a plurality of first menu items in the second page when the termination of the drag event is detected on a second position corresponding to none of the first menu items.

12. The method of claim 11, wherein the moving of the menu item to the desired position in the second page further comprises playing a gliding animation to show the appending of the moved menu item to the end.

* * * * *